United States Patent
Schmidt et al.

(10) Patent No.: US 10,137,855 B2
(45) Date of Patent: Nov. 27, 2018

(54) SAFETY BELT SYSTEM WITH SIGNAL SENDING TENSION SENSOR

(71) Applicant: Key Safety Systems, Inc., Sterling Heights, MI (US)

(72) Inventors: Brian Schmidt, Macomb, MI (US); John Joseph Pollard, Imlay City, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 16 days.

(21) Appl. No.: 15/155,166

(22) Filed: May 16, 2016

(65) Prior Publication Data

US 2016/0339869 A1 Nov. 24, 2016

Related U.S. Application Data

(60) Provisional application No. 62/163,879, filed on May 19, 2015.

(51) Int. Cl.
*B60R 22/48* (2006.01)
*B60R 22/02* (2006.01)

(52) U.S. Cl.
CPC ............ *B60R 22/48* (2013.01); *B60R 22/023* (2013.01); *B60R 2022/027* (2013.01); *B60R 2022/4841* (2013.01)

(58) Field of Classification Search
CPC .............. B60R 22/48; B60R 2022/027; B60R 2022/4841; B60R 22/023
See application file for complete search history.

(56) References Cited

U.S. PATENT DOCUMENTS

| | | | | |
|---|---|---|---|---|
| 6,405,607 B2 * | 6/2002 | Faigle | ................... | B60N 2/002 73/862.381 |
| 6,481,750 B1 * | 11/2002 | Kalina | ................... | B60N 2/002 280/801.1 |
| 7,005,976 B2 * | 2/2006 | Hagenbuch | ............. | B60R 22/48 180/268 |
| 7,209,033 B2 | 4/2007 | Hofbeck et al. | | |
| 7,686,119 B2 * | 3/2010 | Greene | ................... | B60R 22/48 180/268 |
| 9,616,747 B1 * | 4/2017 | Breed | ................ | B60K 31/0058 |
| 2002/0089164 A1 | 7/2002 | Rouhana | | |
| 2003/0172750 A1 * | 9/2003 | Blakesley | ............... | B60R 22/18 73/862.393 |
| 2003/0209088 A1 * | 11/2003 | Sullivan | .................. | B60R 22/48 73/862.391 |
| 2004/0016304 A1 * | 1/2004 | Kaijala | ................... | B60R 22/18 73/862.69 |
| 2004/0262905 A1 * | 12/2004 | Herberg | .................. | B60R 22/02 280/808 |
| 2005/0073187 A1 * | 4/2005 | Frank | ...................... | B60R 22/02 297/484 |
| 2005/0082815 A1 * | 4/2005 | Frank | ...................... | B60R 22/02 280/801.1 |
| 2007/0028888 A1 * | 2/2007 | Jasem | .................... | B60K 28/04 123/198 D |
| 2008/0048858 A1 * | 2/2008 | Lueth | ...................... | B60Q 1/50 340/540 |

(Continued)

*Primary Examiner* — Barry J Gooden, Jr.
(74) *Attorney, Agent, or Firm* — Markell Seitzman

(57) ABSTRACT

A multi-point safety belt system is provided with a tension sensor that opens and closes a switch to send a signal indicating the force securing a seat occupant secured by the safety belt system.

20 Claims, 7 Drawing Sheets

(56) References Cited

U.S. PATENT DOCUMENTS

| | | | |
|---|---|---|---|
| 2010/0025976 A1* | 2/2010 | Murtha | B60R 22/12 |
| | | | 280/801.1 |
| 2011/0062698 A1 | 3/2011 | Xu et al. | |
| 2012/0217733 A1 | 8/2012 | Adolfson et al. | |
| 2012/0217787 A1 | 8/2012 | Adolfson et al. | |
| 2014/0303851 A1* | 10/2014 | Nagasawa, Sr. | ............ |
| | | | B60R 21/01544 |
| | | | 701/45 |
| 2016/0236678 A1* | 8/2016 | Upadhyay | B60N 2/26 |

* cited by examiner

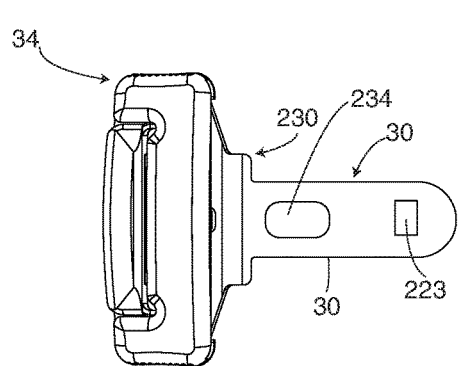 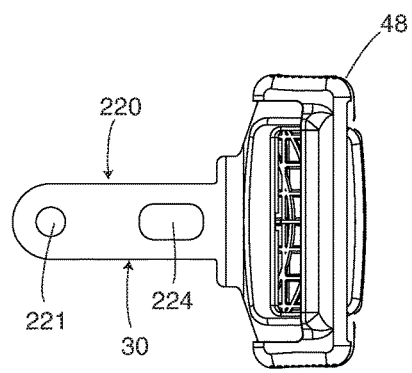
Fig 3b    Fig 3c
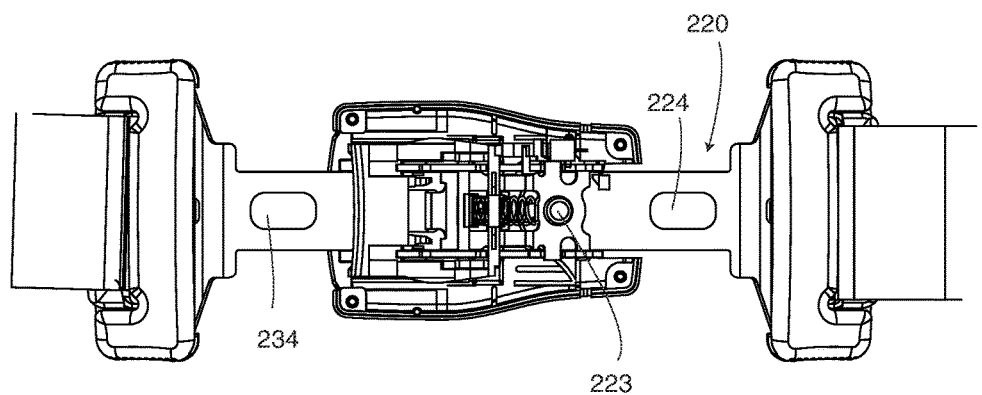
Fig 3a

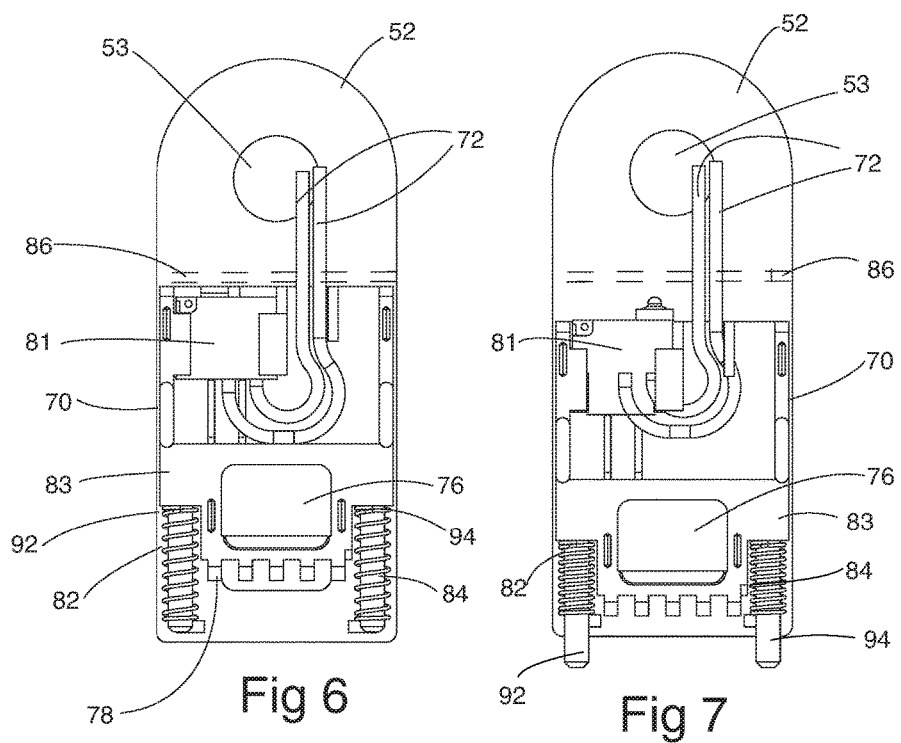

SAFETY BELT SYSTEM WITH SIGNAL SENDING TENSION SENSOR

This application claims the benefit of U.S. Provisional Application 62/163,879, filed on May 19, 2015. The disclosure of the above application is incorporated herein by reference.

FIELD OF THE INVENTION

The present invention relates to a system for sending an electrical signal based upon the force with which an occupant of a vehicle seat is secured in place by a multi-point safety belt system such as a four point or five point safety belt system.

BACKGROUND OF THE INVENTION

Motor vehicles such as all terrain vehicles or even go karts may have one or more passenger seats that are provided with multi-point safety belts to secure seat occupants in position as the vehicle travels at substantial speeds. All-terrain vehicles may travel across very rugged terrain, often becoming airborne for short distances. At least some seat occupants prefer to have a four point safety belt fit loosely for the sake of comfort, but comfort does not necessarily equate to safely restraining a seat occupant during a rough ride. In traditional motor vehicles a traditional three point safety belt provides tension to the lap strap and shoulder strap using a belt retractor to ensure that the safety belt is worn properly. There is a need for insuring the restraint of a seat occupant of a non-traditional motor vehicle, such as an all-terrain vehicle using a four point or five point safety belt system, is adequate during high speed operation of the all-terrain vehicle. That need is met by the present invention which sends an electrical signal to a controller in the vehicle if any seat occupant, vehicle operator or passenger, is not adequately restrained as determined by a tension sensor associated with a multi-point safety belt system.

DISCUSSION OF THE PRIOR ART

US 20120217787 A1 and US 20120217733 A1 disclose a four point safety belt system with belt tensioners, but the belt tensioners operate in a reactive manner rather than a preventive manner like the present invention.

US 20110062698 A1 discloses a four point safety belt system where the safety belts on each side of the centerline of a seat can be tightened separately in the event of a rollover crash, but this encourages loose fitting of the safety belts which is not necessarily desirable.

US 20020089164 A1 discloses a four point safety belt system including pre-crash sensors to tighten up the safety belts only when pre-crash conditions are sensed, but this encourages loose fitting of the safety belts which is not necessarily desirable.

U.S. Pat. No. 7,209,033 B2 discloses a system for determining if a vehicle seat is occupied and if occupied if the safety belt is fastened, but if does not determine how tightly a safety belt is secured around a seat occupant.

The problem left unsolved by the prior art is the possibility a seat occupant is only loosely secured by a four point safety belt system, allowing possibly dangerous movement of the seat occupant inside the boundaries of the safety belt and vehicle seat during movement of the vehicle over rough terrain at high speed. This is addressed only in a reactive manner instead of in a preventive manner.

SUMMARY OF THE INVENTION

There is provided in accordance with one aspect of the present invention a safety belt system provided with a tension sensor that opens and closes a switch to send a signal indicating the force securing a seat occupant secured by the safety belt system.

There is provided in accordance with another aspect of the present invention a multi-point safety belt system having a first shoulder belt fixed to a safety belt buckle and a first lap belt fixed to the same safety belt buckle in a manner that allows the effective length of the first lap belt to be adjusted; a second shoulder belt fixed to a buckle tongue and a second lap belt fixed to the same buckle tongue in a manner that allows the effective length of the second lap belt to be adjusted; at least one tension sensor fixed to one of the first and second lap belts to sense the tension on the effective lengths of the first and second lap belts, the tension sensor opens or closes a switch when the tension sensed by the tension sensor is below a fixed level, the tension sensed by the tension sensor being an indication of the force securing a seat occupant secured by the safety belt system.

BRIEF DESCRIPTION OF THE DRAWINGS

FIG. 3a is a view of the underside of the assembly shown in FIG. 1 or 2.

FIGS. 3b and 3c are top plan views of two latch plate assemblies.

FIGS. 6 and 7 are schematic views showing the internal parts of the exemplary tension sensor in a static state and in an active state, that is with tension applied by a lap belt.

DETAILED DESCRIPTION OF THE INVENTION

Figure 1:
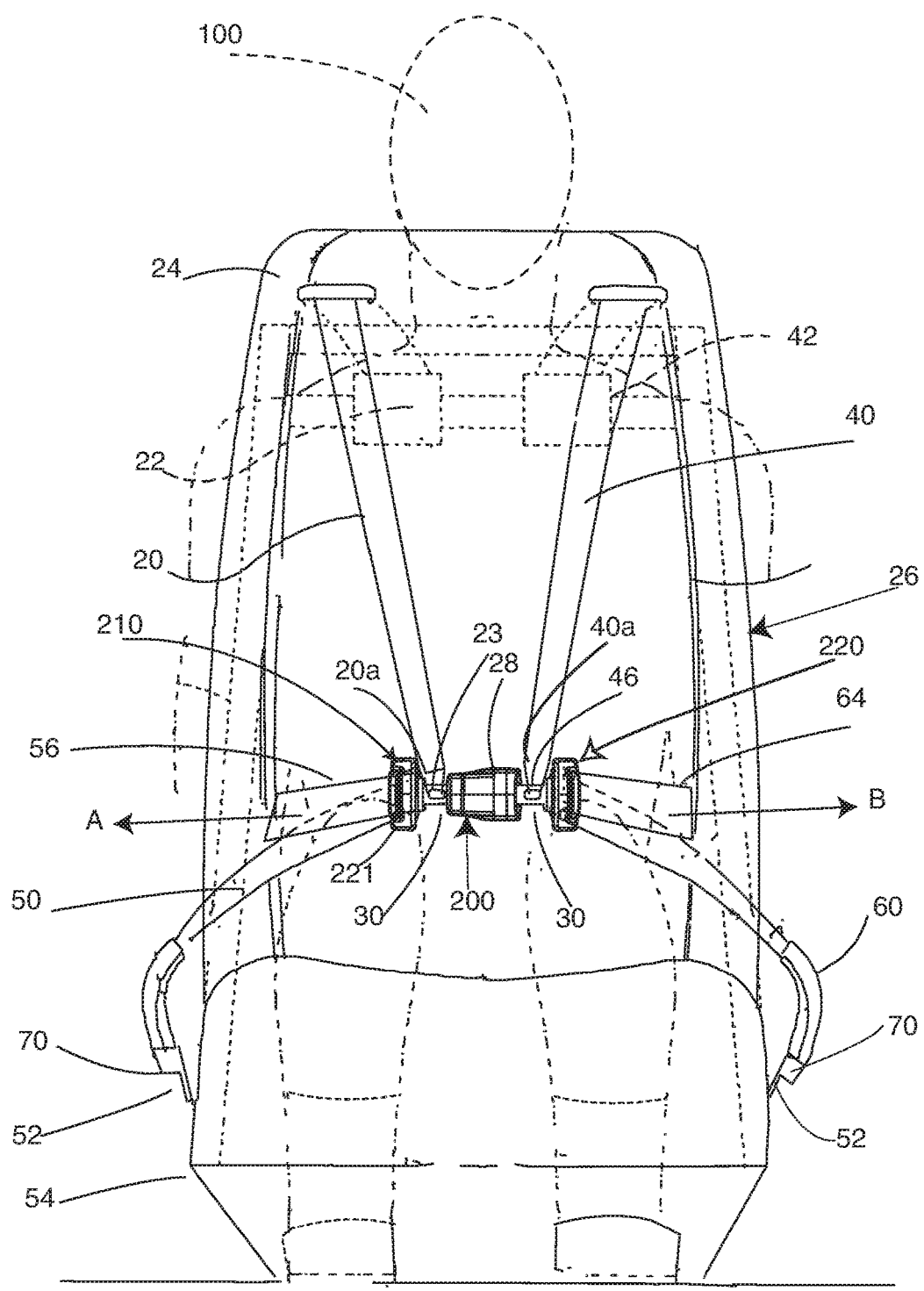
FIG. 1 is a front view of a vehicle seat provided with an exemplary multi-point safety belt system of the present invention.
Figure 2:
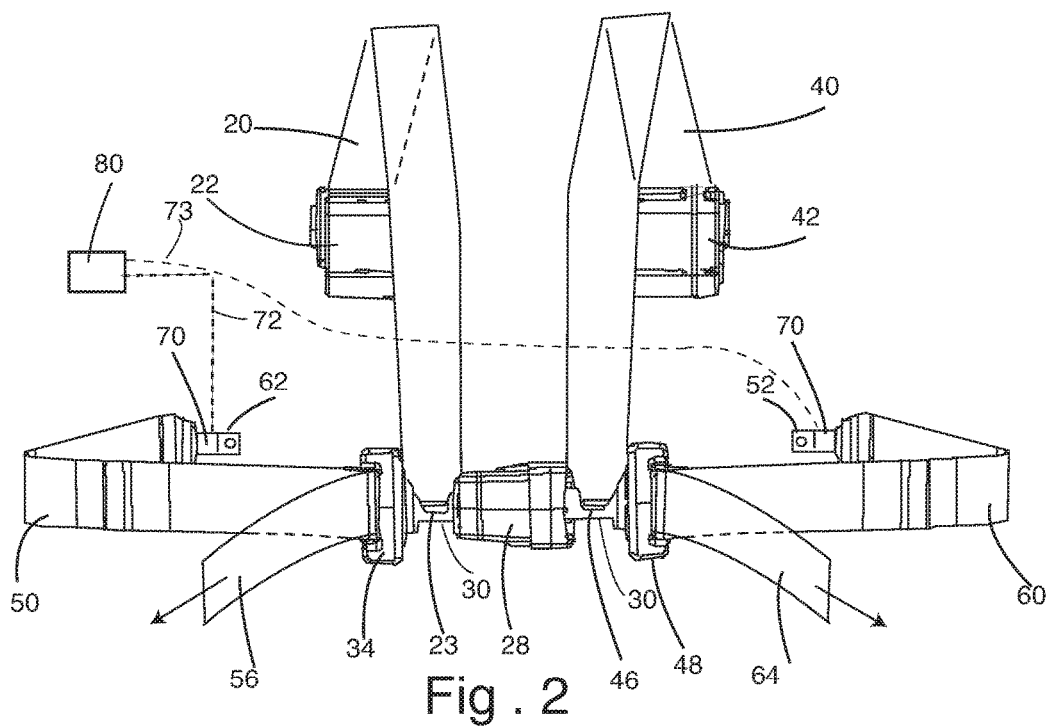
FIGS. 2 and 2A are schematic representation of the multi-point safety belt system with FIG. 2 relating to the embodiment shown in FIG. 1 and FIG. 2A referring to an alternative embodiment with only one tension sensor.

FIG. 1 is a front view of a vehicle seat provided with an exemplary multi-point safety belt system of the present invention, FIG. 2 is a schematic view of the safety belt system without the seat being shown, and FIGS. 1, 2 and 3a also show an assembly of a safety belt retractor with a buckle and tongues of respective latch plate assembly with belt webbing threaded through the latch plate assembly. As used herein and in the claims the term "multi-point safety belt system" is understood to refer to a safety belt system for a motor vehicle wherein the belts are attached to a vehicle seat and/or structural members of the vehicle at four or five locations.

A first safety belt member 20, commonly referred to as a shoulder belt, has a first end anchored to safety belt retractor 22 that is fixed to a top portion of a seat back 24 of a seat 26 fixed to a motor vehicle or to a structural member of the motor vehicle in the region of the seat back 24. A second end 20a of the first safety belt member 20 is secured to a buckling mechanism 200. The buckling mechanism includes a safety belt buckle 28 much the same as the buckle of U.S. Pat. No. 4,451,958 which is incorporated herein by reference. The buckling mechanism 200 further includes a first or fixed latch plate assembly 220 and a second or free latch plate assembly 230. The Latch plate assembly 220 is riveted to the buckle frame much the same way as the plate 43 is secured to the frame of the buckle in U.S. Pat. No. 5,050,274, which is incorporated herein by reference. The Latch plate assembly 230 is lockingly received in the safety belt buckle in a conventional manner. Each latch plate assembly includes a cinching mechanism 34, 48 located near an end thereof. As will be seen an end of each lap belt 50, 60 is threaded through a respective cinching mechanism 34, 48. These cinching mechanisms 34, 48 are much the same as taught in U.S. Pat. No. 5,050,274. As an aside, in the art the latch plate assembly is often called a tongue. Further, the tip of the latch plate that is received and locked by the safety belt buckle is also called by some a tongue. As can be seen there is some flexibility in the way these components are named. Some of these terms may be used interchangeably herein. Each latch plate assembly 220, 230 includes a plate 30 which includes a plurality of openings. A first of the opening in each plate 30 is located closer to the tip of the plate 30. The first opening 221 of the latch plate assembly 220 is circular to receive a fastener such as a rivet 223. The first opening 223 in the plate of latch plate assembly 230 is oval in shape and analogous to opening 20 of the U.S. Pat. No. 5,050,274 and is lockingly engaged by the lock of the safety belt buckle. Each of the plates 30 of the first and second latch plate assemblies includes a second opening 224, 234 which is generally oval in shape. As will be seen an end of the shoulder belt is respectively secured to each of these second openings 224 and 234. As mentioned the first safety belt member 20 extends through the opening 234 in the plate 30 of the latch plate assembly 230 and is sewn permanently to itself. That is to say one end of the first safety belt member, (first shoulder belt), is anchored by a safety belt retractor and another end of the first safety belt member is anchored to a safety belt buckle via a plate 30 of a latch plate assembly.

A second safety belt member 40, also commonly referred to as a shoulder belt, has a first end (which is not visible) anchored to second safety belt retractor 42 that is fixed near a reinforced portion of the seat back 24 or to a structural member of the motor vehicle in the region of the seat back. A second end 40a of the second safety belt member 40 is fixed to a buckle tongue 44 of a latch plate assembly that is received by opening 224 of plate 30. That is to say one end of the second safety belt member, (first shoulder belt), is anchored by a safety belt retractor and another end of the second safety belt member is anchored by a latch plate assembly.

A third safety belt member 50, commonly referred to as a lap belt, has a first end that is fixed by an anchor 52 to tension sensor 70 which in turn is anchored to a seat base 54 of the seat or to a structural member of the motor vehicle in the region of the seat base. The third safety belt member extends through the spring loaded cinching mechanism 34 that is fixed to the safety belt buckle whereby a length of the third safety belt member extending between the anchor and the safety belt buckle is adjustable by pulling on or shortening the portion 56 of the third safety belt member that extends past the spring loaded cinching mechanism 34. The spring loaded belt guide functions to securely cinch the safety belt, (lap belt), in an operative position when the safety belt is used to secure a seat occupant. That is to say one end of the third safety belt member, (first lap belt), is anchored by a tension sensor and an anchor member to a seat or a structural member of the vehicle and another end of the third safety belt member is anchored by a safety belt buckle.

A fourth safety belt member 60, also commonly referred to as a lap belt, has a first end that is secured to a first tension sensor 70 and a second end that extends through the cinching mechanism 221 at the end of the latch plate assembly 220 that is fixed to the safety belt buckle 28. The second end of the belt member 60 is adjustable by pulling on or shortening the portion 64 of the fourth safety belt member 60 that extends past the cinching mechanism 221. The cinching mechanism functions to securely cinch the safety belt, (lap belt), in an operative position when the safety belt is used to secure a seat occupant. That is to say one end of the fourth safety belt member, (second lap belt), is anchored by a tension sensor and the other end of the fourth safety belt member is anchored by the safety belt buckle.

Figure 2A:
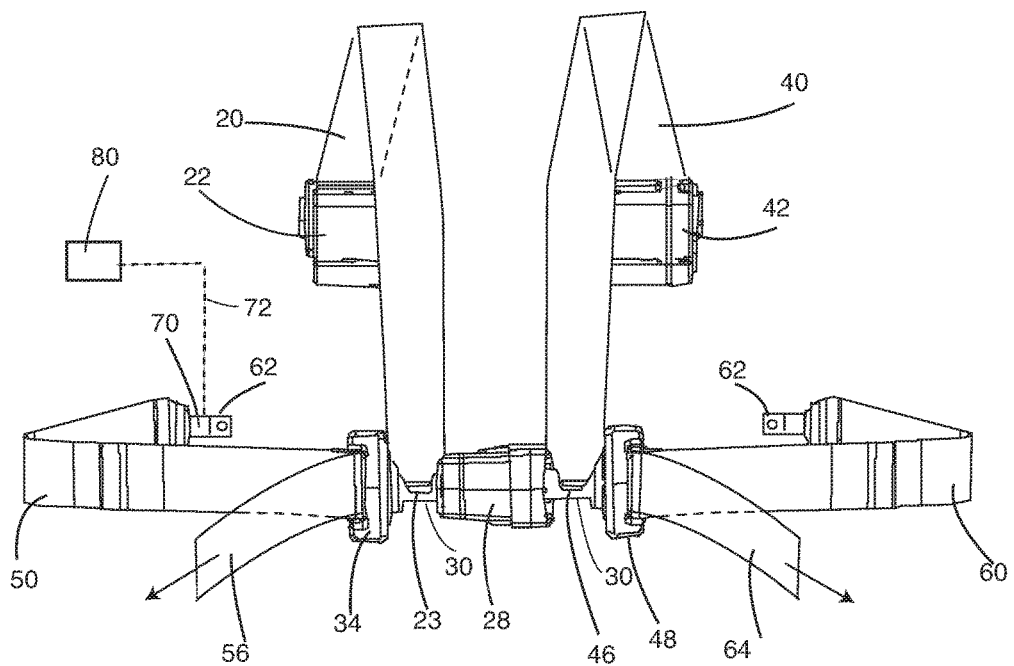

In one embodiment, as shown in FIGS. 1 and 2, a tension sensor 70 is fixed to the second end of each of the third and fourth safety belt members 50, 60 (the first and second lap belts) to sense the tension on the length of the third safety belt member between a tension sensor and the safety belt buckle 28 and the tension on the length of the fourth safety belt member between a tension sensor and the safety belt buckle. As will be seen below the second ends of the lap belts are looped about one end of the tension sensor. The other end of the tension sensor 70 is secured to a fixed anchor position on the seat or on the vehicle via an anchor member 52. The tension sensed by the tension sensor 70 is an indication of the force securing a seat occupant 100 to the seat. As shown in phantom lines in FIG. 2, the tension sensors are in circuit communication via a conductor 72 with an electronic device 80. The electronic device 80 may perform any suitable function to enhance the safety of a seat occupant 100 such as limiting the speed of the motor vehicle to a set speed when the tension sensed by the tension sensor is below a fixed level and allows the vehicle to exceed the set speed when the tension sensed by the tension sensor meets the fixed level. In another embodiment as shown in FIG. 2A, a safety belt system of the present invention may employ only a single tension sensor 70 associated with one of the lap belts and that the other lap belt may be anchored to an anchor plate in the conventional manner, but in all other respects the two embodiments are identical and function in the same manner.

Figure 4:
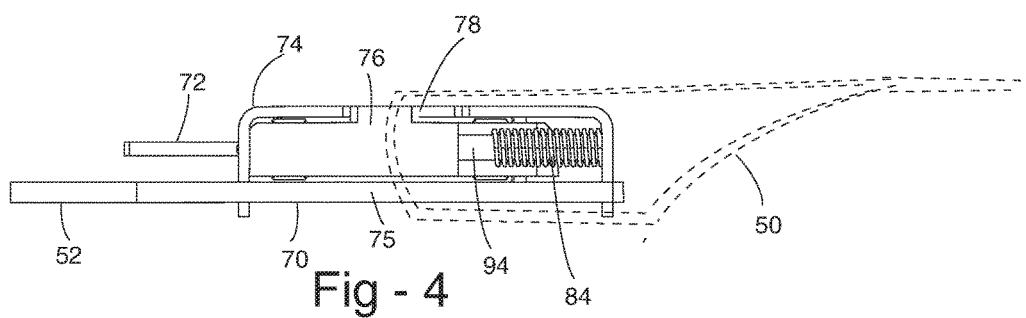
FIGS. 4 and 5 are side views showing the internal parts of an exemplary tension sensor in a static state and in an active state, that is with tension applied by a lap belt.
Figure 5:
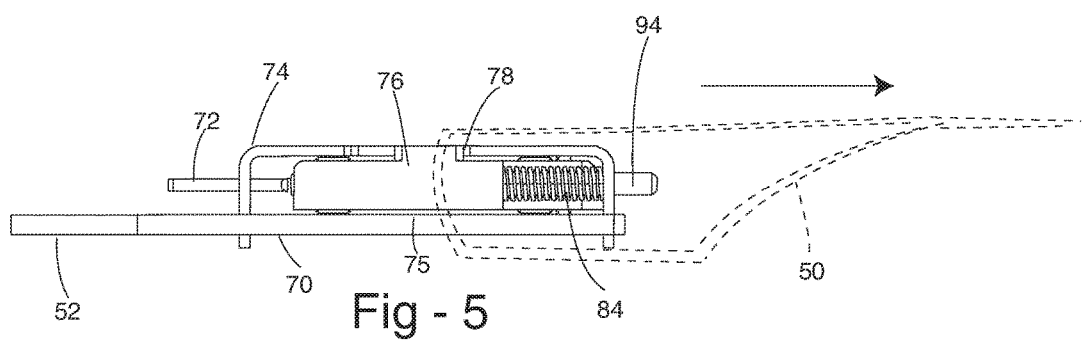
Figure 8:
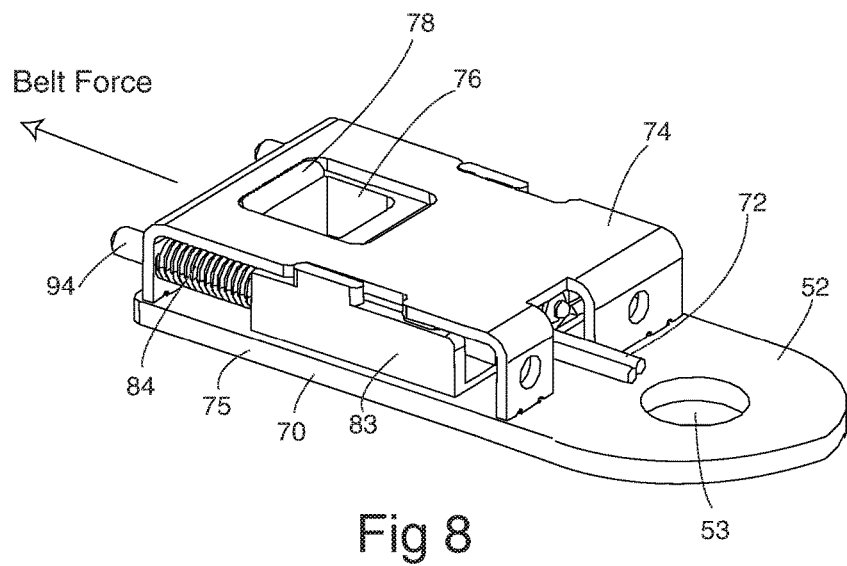
FIG. 8 is a perspective view of the exemplary tension sensor.

The structure and function of an exemplary tension sensor 70 can be better understood by referring now to FIGS. 4-8. FIGS. 4 and 5 are side views showing the internal parts of an exemplary tension sensor in a static state and in an active state, that is, with tension applied by a lap belt. FIGS. 6 and 7 are schematic views illustrating the exemplary tension sensor in a static state and in an active state. FIG. 8 is a perspective view of the exemplary tension sensor.

The exemplary tension sensor 70 is shown with a base plate 75 that is integral with an anchor plate 52. The anchor plate 52 is provided with an opening 53 for receiving a fastener (not shown) that attaches the anchor plate and the tension sensor to the base or a seat. It is understood that the design of the anchor plate/tension sensor may be altered to facilitate attaching the anchor plate/tension sensor to any structural member of a vehicle such as a floor of the vehicle. A housing 74 is fixed to the base plate of the tension sensor. The housing 74 and the base plate portion of the tension sensor have aligned complementary openings 76. A switch 81 is mounted to a carrier 83 that slides in the housing 74 when a pulling force is placed on the carrier by a safety belt. In this example the third safety belt member 50, which is a lap belt, is looped around a bar 78 that closes an opening in the carrier that receives the loop of the lap belt and an end of the lap belt is sewn permanently to itself. This structure allows the lap belt to be simultaneously fixed to the tension sensor and anchored to a seat base or a structural member of the vehicle. The tension sensor is provided with springs 82, 84 wherein one end of each spring is mounted to a post 92, 94 fastened to the carrier and the other end of each post passes through a complementary opening in the housing to facilitate compression of the springs by force exerted by a safety belt member. A switch contact 86 is mounted to the housing 74. As shown in FIGS. 4 and 6 the switch, of a type commonly referred to as a microswitch, is in a normally closed position contacting the switch contact 86 when there is no tension or tension below a selected level dictated by the compression strength of the springs 82, 84. When a selected amount of tension dictated by the strength of the springs 82, 84 is placed on the carrier 82 by the lap belt 50 via the bar 78 the carrier moves in the housing and the switch 81 is moved away from the switch contact 86 as shown in FIGS. 5 and 7. As shown in FIG. 2 a conductor 72, 73 that is fixed to the switch in a conductive manner extends from the switch to an electronic device 80 which receives signals from the tension sensor and is the source of electrical power for the tension sensor.

The electronic device 80 may serve any function selected by a vehicle manufacturer. For example a lighted status indicator located in the line of vision of a vehicle operator may indicate that a safety belt system is not tightened to restrain a passenger and/or the vehicle operator sufficiently and that the safety belt system should be adjusted to put more tension of the lap belt. Another example is If the tension in each lap belt is below a sufficient level the tension sensor will not change the state, then the vehicle can only proceed at a low speed (as selected by a vehicle manufacturer). The driver/passenger will realize he or she needs to tighten the lap belt which would cause the tension sensor to change the state thereby signaling the electronic device and then the driver can operate the motor vehicle at a speed selected by the driver.

Referring again to FIG. 1 a vehicle operator or passenger 100 places himself on a seat 24, 54 and brings the first and third safety belt members 20, 50 (the first shoulder belt and lap belt assembly) across his torso, then brings the second and fourth safety belt members 40, 60 across his torso. The plate 30 of the latch plate assembly 230 is inserted into an opening in the safety belt buckle 28 such that the buckle tongue is locked in place in the safety belt buckle. The seat belt retractors 22, 42 operate to keep the respective shoulder belts taut. The vehicle operator or passenger then pulls on the loose ends 56, 64 of the lap belts in directions indicated by arrows A and B in FIG. 1 to tighten the lap belts. Tightening the lap belts results in tension that is sensed by the tension sensors 70 which send signals to the electronic device 80 indicating if the safety belt system is restraining the vehicle operator or passenger to a degree selected by the vehicle manufacturer.

Figure 9:
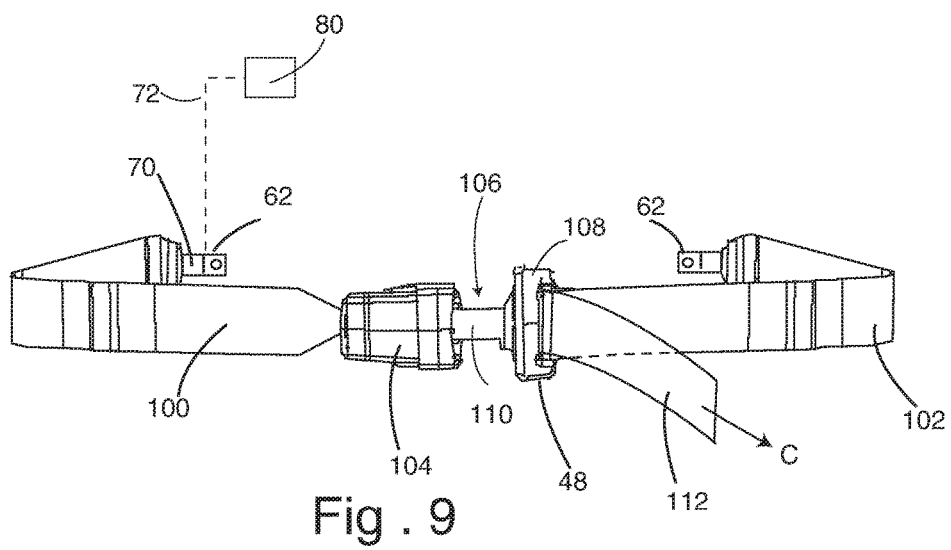
FIG. 9 is a schematic representation of a two point safety belt system having a tension sensor that sends a signal indicating the force securing a seat occupant.

Referring next to FIG. 9 there is shown a schematic representation of a two point safety belt system having a tension sensor 70 of the type described above that sends a signal indicating the force securing a seat occupant. The safety belt system of this embodiment has a first safety belt member 100 that is a lap belt, and a second safety belt member 102 that is also a lap belt. A first end of the first safety belt member 100 is anchored to a tension sensor 70 like that already described in detail with respect to FIGS. 4-8. As described above with respect to the first two embodiments the tension sensor is fixed to a seat base or a structural member of a vehicle via an anchor 62. A second end of the first safety belt member is fixed to a safety belt buckle 104 in a conventional manner. A first end of the second safety belt member 102 is anchored by an anchor 62 fixed to a seat base or a structural member of a vehicle. The second safety belt member is fixed to cinching mechanism 108 of a latch plate assembly 106 in a conventional manner. A tongue 110 of the latch plate assembly is inserted in a slot in the safety belt buckle 104 and secured to the safety belt buckle by a locking mechanism in a convention manner. The safety belt system may be adjusted to secure a seat occupant securely by pulling on a free portion 112 of the second safety belt member in a direction indicated by arrow C in FIG. 9. The tension sensor 70 is in circuit communication via a conductor 72 with an electronic device 80 and sends a signal to the electronic device 80. As described above the tension sensed by the tension sensor 70 is an indication of the force securing a seat occupant to a seat, and the electronic device can employ this data in any suitable manner as described above.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A safety belt system having first and second lap belts that are adjustable to vary a force on each of said lap belts, an end of one of the lap belts connected to a tension sensor, the tension sensor connected to an anchor, an end of the other lap belt connected to an anchor, the anchors each being fixed to a component of a vehicle, and the tension sensor being capable of generating a signal indicating a tension sensed in the first and second lap belts and sending the signal to an electronic device, and wherein the tension sensor has a base plate integral with an anchor plate for attaching the tension sensor to any structural member of the vehicle including a floor or a base of a seat and further has a housing containing a switch mounted to a carrier, the carrier slides in the housing when a pulling force is placed on the carrier by an end of the lap belt, the end being looped about a bar and sewn to itself fixed to the carrier of the tension sensor, the housing having a switch contact and when the carrier slideably moves in the housing in response to the pulling force of the lap belt, the switch moves away from the switch contact allowing a conductor fixed to the switch in a conductive manner to send signals from the tension sensor to the electronic device.

2. The safety belt system of claim 1 wherein the anchor plate is provided with an opening for receiving a fastener that attaches the anchor plate and the tension sensor to the base or the seat.

3. The safety belt system of claim 1 wherein the housing and the base plate of the tension sensor have aligned complementary openings.

4. The safety belt system of claim 1 wherein each tension sensor is provided with springs wherein one end of each spring is mounted to a post fastened to the carrier and the other end of each post passes through the complementary opening in the housing to facilitate compression of the springs by force exerted by the lap belt.

5. The safety belt system of claim 1 wherein the switch is a microswitch, the microswitch being in a normally closed position contacting the switch contact when there is no tension or tension below a selected level dictated by the compression strength of the springs and when a selected amount of tension dictated by the strength of the springs is placed on the carrier by the lap belt via the bar, the carrier moves in the housing and the switch is moved away from the switch contact.

6. The safety belt system of claim 1 wherein the conductor fixed to the switch in a conductive manner extends from the switch to an electronic device which receives signals from the tension sensor and is the source of electrical power for the tension sensor.

7. A multipoint safety belt system comprising:
(a) a first safety belt member having a first end anchored to a first safety belt retractor that is fixed to a top portion of a seat back of a seat fixed to a motor vehicle or to a structural member of the motor vehicle in a region of the seat back and having a second end fixed to a safety belt buckle;
(b) a second safety belt member having a first end anchored to a second safety belt retractor that is fixed to the top portion of the seat back of the seat fixed to the motor vehicle or to the structural member of the motor vehicle in the region of the seat back and having a second end fixed to a buckle tongue that is received by the safety belt buckle to fix the buckle tongue to the safety belt buckle;
(c) a third safety belt member having a first end that is fixed by an anchor to a seat base of the seat or to the structural member of the motor vehicle in the region of the seat base, with the third safety belt member being a first lap belt extending through a cinching mechanism that is fixed to the safety belt buckle whereby a length of the third safety belt member extending between the anchor and the safety belt buckle is adjustable;
(d) a fourth safety belt member having a first end that is fixed by an anchor to the seat base of the seat or to the structural member of the motor vehicle in the region of the seat base, with the fourth safety belt member being a second lap belt extending through a cinching mechanism that is fixed to the buckle tongue whereby a length of the fourth safety belt member extending between the anchor and the buckle tongue is adjustable;
(e) a tension sensor fixed to each of the third and fourth safety belt members to sense the tension on the length of the third safety belt member extending between the anchor and the safety belt buckle and the tension on the length of the fourth safety belt member and the buckle tongue, each tension sensor being in circuit communication with an electronic device, the tension sensed by the tension sensor being an indication of the force securing a seat occupant secured by the safety belt members, and wherein each tension sensor has a base plate integral with an anchor plate for attaching the tension sensor to any structural member of the vehicle including a floor or a base of a seat and further has a housing containing a switch mounted to a carrier, the carrier slides in the housing when a pulling force is placed on the carrier by an end of the first or second lap belt attached to the carrier, the end being looped about a bar and sewn to itself fixed to the carrier of the tension sensor, the housing having a switch contact and when the carrier slideably moves in the housing in response to the pulling force of the attached first or second lap belt, the switch moves away from the switch contact allowing a conductor fixed to the switch in a conductive manner to send signals from the tension sensor to the electronic device.

8. The multipoint safety belt system of claim 7 wherein the electronic device limits the speed of the motor vehicle to a set speed when the tension sensed by the tension sensor is below a fixed level and allows the vehicle to exceed the set speed when the tension sensed by the tension sensor meets the selected level.

9. The multipoint safety belt system of claim 7 wherein the anchor plate is provided with an opening for receiving a fastener that attaches the anchor plate and the tension sensor to the base or the seat.

10. The multipoint safety belt system of claim 7 wherein the housing and the base plate of the tension sensor have aligned complementary openings.

11. The multipoint safety belt system of claim 7 wherein each tension sensor is provided with springs wherein one end of each spring is mounted to a post fastened to the carrier and the other end of each post passes through the complementary opening in the housing to facilitate compression of the springs by force exerted by the lap belt.

12. The multipoint safety belt system of claim 7 wherein the switch is a microswitch, the microswitch being in a normally closed position contacting the switch contact when there is no tension or tension below a selected level dictated by the compression strength of the springs and when a selected amount of tension dictated by the strength of the springs is placed on the carrier by the lap belt via the bar, the carrier moves in the housing and the switch is moved away from the switch contact.

13. The multipoint safety belt system of claim 7 wherein the conductor fixed to the switch in a conductive manner extends from the switch to an electronic device which receives signals from the tension sensor and is the source of electrical power for the tension sensor.

14. A multipoint safety belt system comprising:
(a) a first safety belt member having a first end anchored to a first safety belt retractor that is fixed to a top portion of a seat back of a seat fixed to a motor vehicle or to a structural member of the motor vehicle in a region of the seat back and having a second end fixed to a safety belt buckle;
(b) a second safety belt member having a first end anchored to a second safety belt retractor that is fixed to the top portion of the seat back of the seat fixed to the motor vehicle or to the structural member of the motor vehicle in the region of the seat back and having a second end fixed to a buckle tongue that is received by the safety belt buckle to fix the buckle tongue to the safety belt buckle;
(c) a third safety belt member having a first end that is fixed by an anchor to a seat base of the seat or to the structural member of the motor vehicle in the region of the seat base, with the third safety belt member being a first lap belt extending through a spring loaded belt guide that is fixed to the safety belt buckle whereby a length of the third safety belt member extending between the anchor and the safety belt buckle is adjustable;
(d) a fourth safety belt member having a first end that is fixed by an anchor to the seat base of the seat or to the structural member of the motor vehicle in the region of the seat base, with the fourth third safety belt member being a second lap belt extending through a spring loaded belt guide that is fixed to the buckle tongue whereby a length of the fourth safety belt member extending between the anchor and the buckle tongue is adjustable;

(e) at least one tension sensor fixed to one of the third and fourth safety belt members to sense the tension on the length of the third safety belt member extending between the anchor and the safety belt buckle or the tension on the length of the fourth safety belt member and the buckle tongue, the tension sensor being in circuit communication with an electronic device, the tension sensed by the tension sensor being an indication of the force securing a seat occupant secured by the safety belt members, and wherein each tension sensor has a base plate integral with an anchor plate for attaching the tension sensor to any structural member of the vehicle including a floor or a base of a seat and further has a housing containing a switch mounted to a carrier, the carrier slides in the housing when a pulling force is placed on the carrier by an end of the first or second lap belt attached to the carrier, the end being looped about a bar and sewn to itself fixed to the carrier of the tension sensor, the housing having a switch contact and when the carrier slideably moves in the housing in response to the pulling force of the first or second attached lap belt, the switch moves away from the switch contact allowing a conductor fixed to the switch in a conductive manner to send signals from the tension sensor to the electronic device.

15. The multipoint safety belt system of claim 14 wherein the electronic device limits the speed of the motor vehicle to a set speed when the tension sensed by the tension sensor is below a fixed level and allows the vehicle to exceed the set speed when the tension sensed by the tension sensor meets the selected level.

16. The multipoint safety belt system of claim 14 wherein the anchor plate is provided with an opening for receiving a fastener that attaches the anchor plate and the tension sensor to the base or the seat.

17. The multipoint safety belt system of claim 14 wherein the housing and the base plate of the tension sensor have aligned complementary openings.

18. The multipoint safety belt system of claim 14 wherein each tension sensor is provided with springs wherein one end of each spring is mounted to a post fastened to the carrier and the other end of each post passes through the complementary opening in the housing to facilitate compression of the springs by force exerted by the lap belt.

19. The multipoint safety belt system of claim 14 wherein the switch is a microswitch, the microswitch being in a normally closed position contacting the switch contact when there is no tension or tension below a selected level dictated by the compression strength of the springs and when a selected amount of tension dictated by the strength of the springs is placed on the carrier by the lap belt via the bar, the carrier moves in the housing and the switch is moved away from the switch contact.

20. The multipoint safety belt system of claim 14 wherein the conductor fixed to the switch in a conductive manner extends from the switch to an electronic device which receives signals from the tension sensor and is the source of electrical power for the tension sensor.

* * * * *